March 2, 1965 C. FRANKLIN 3,172,018
CONTROL CIRCUIT BRIDGE FOR A RELAY
Filed Nov. 29, 1960
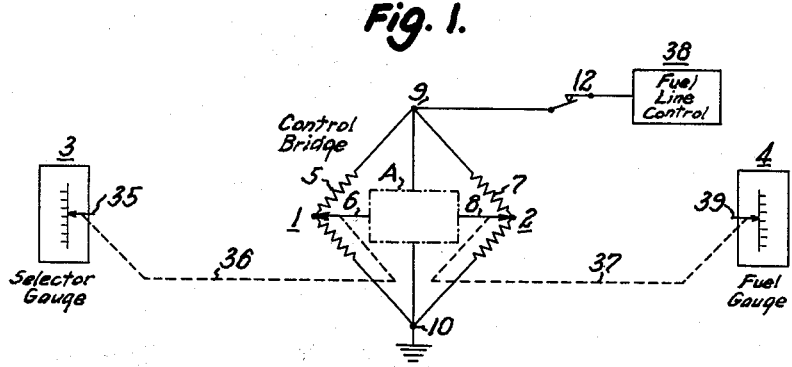
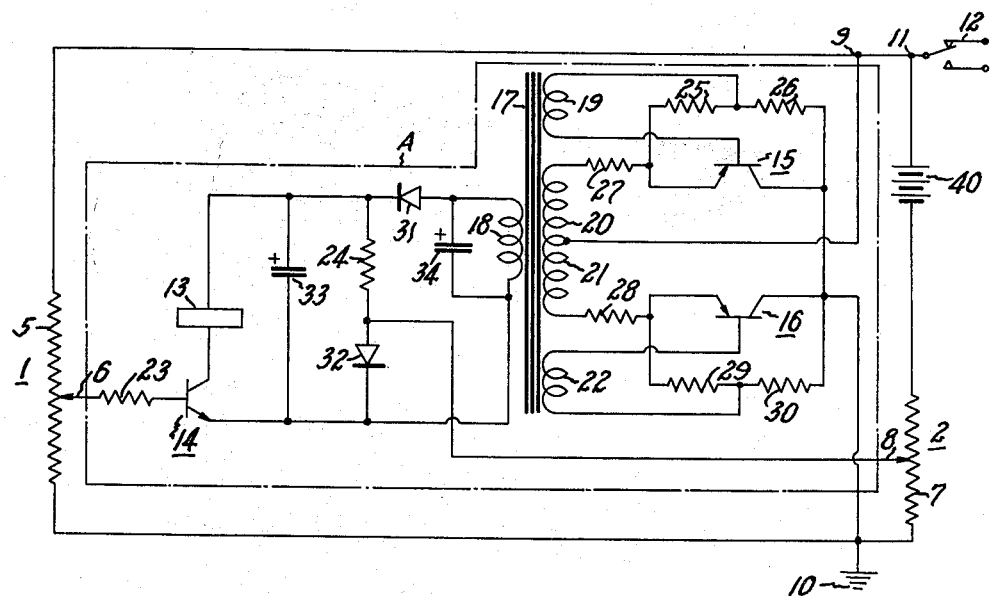
INVENTOR.
Cecil Franklin
BY
Elvin E. Gregg United States Patent Office 3,172,018
Patented Mar. 2, 1965

3,172,018
CONTROL CIRCUIT BRIDGE FOR A RELAY
Cecil Franklin, Vergennes, Vt., assignor to Simmonds Precision Products, Inc., Tarrytown, N.Y., a corporation of New York
Filed Nov. 29, 1960, Ser. No. 72,384
3 Claims. (Cl. 317—148.5)

This invention relates to a transistor operated load limit control which operates an extremely sensitive switching relay. The control circuit includes a D.C. bridge circuit which comprises telemetering and load selecting potentiometers.

In many fueling operations, the amount and quantity of fuel which may be transferred is highly critical and must be controlled with the utmost accuracy. The fuel pumps handling these operations are often controlled by a slave relay and a solenoid valve in the fuel line. These latter elements must be connected to suitable electronic actuating circuitry. It is desirable to utilize circuitry to actuate the relay which is stable and possesses a high degree of sensitivity. The presently known and available control circuits do not operate at the required degree of sensitivity and the resulting limits of control relay operation are too varied for the type of control desired.

It is, therefore, a prime object of this invention to provide a highly sensitive Wheatstone-bridge circuit for use in controlling an external switching function.

It is a still further object to provide circuits of novel design cooperating with the bridge circuit, but which are useful in other applications.

It is an additional object of this invention to provide a load limit control circuit including an extremely sensitive relay which is operated directly by the unbalance voltage which appears across a D.C. bridge circuit.

Various other objects, advantages and features of the invention will become apparent from the following detailed description taken in conjunction with the accompanying drawings, in which:

FIG. 1 is a block diagram of a representative system in which this invention is utilized; and FIG. 2 is a schematic circuit diagram showing the details of the Wheatstone bridge network of the representative system shown in FIG. 1.

Referring to FIG. 1 of the drawings, it will be seen that the apparatus of the invention includes identical gauges 3 and 4 each of which are ganged respectively to an arm of a Wheatstone control bridge network A. As shown in this block diagram, movable gauge needle 35 of selector gauge 3 is connected to a movable contact 6 of the bridge network by suitable gang or interconnecting means 36. The gang means is shown merely as a dotted line for convenience. The fuel gauge 4, also shown in FIG. 1, includes a graduated scale which is substantially the same as that shown in selector gauge 3. The movable gauge needle 39 of fuel gauge 4 is also shown ganged to movable contact 8 of the control bridge network by suitable gang means shown as dotted line 37. It will be apparent to those skilled in the art that various types of conventional gang means may be employed in either instance. The control bridge network includes potentiometers 1 and 2 as the balancing resistors of the bridge. The potentiometers 1 and 2 include the usual resistances and movable contacts. The load selecting potentiometer 1 comprises a linear resistance 5 and movable contact 6 which is ganged to the selector gauge 3 as described above. The telemetering or gauge potentiometer 2 includes a linear resistance 7 and a movable contact 8. Also, as referred to hereinbefore, movable contact 8 is connected with the movable gauge needle 39 of fuel gauge 4. The dot and dash rectangle A, schematically shown in FIGS. 1 and 2, represents the particular circuitry which is the subject of FIG. 2 and which will be described more fully hereinafter. As shown, rectangle A is connected between movable contacts 6 and 8 and points 9 and 10 of the bridge network. Relay contacts 12 are shown connected between point 9 of the bridge network and fuel line control 38. This latter element is illustrated merely as a block diagram since the particular functions of the fuel line control are not important to this invention. Suffice it to say, fuel line control 38 controls a flow of fuel to and from a storage tank (not shown). The level of fuel in this tank is measured by fuel gauge 4. The position of movable gauge needle 39 will correspond to the level of fuel found in the storage tank (not shown). It will now be apparent that relay contacts 12 when closed govern the operation of the fuel line control system 38. As will be explained more fully hereinafter, relay contacts 12 are controlled by the networks of the control bridge circuit. The gauge needle 35 of selector gauge 3 is manually adjustable. It will be appreciated then that a movement of needle 35 will result in a corresponding movement of movable contact 6 of load selecting potentiometer 1. Accordingly, it will be understood that the position of movable contact 8 of telemetering potentiometer 2 will always correspond to the position of gauge needle 39 of fuel gauge 4.

In view of the above description, it will be noted that manually adjustable gauge needle 35 may be moved to select a desired amount of fuel. Since a movement of needle 35 results in a corresponding movement of contact 6, the bridge network will become unbalanced. As will be discussed more fully hereinafter, the bridge unbalance produces a voltage which actuates the relay contacts 12. This latter operation is effective to start the flow of fuel under the control of the fuel line system 38. This flow of fuel will result in a movement of gauge needle 39. As discussed above, this movement of needle 39 results in a corresponding movement of contact 8. When contact 8 reaches a point on resistor 7 corresponding to the position of contact 6 on resistor 5, the bridge network will again be balanced. As is well known in the art, a balanced bridge network produces no voltage. This null point results in an opening of relay contacts 12 and a cessation of fuel flow. At this point, gauge needles 35 and 39 are at the same points on their respective scales and the desired amount of fuel has been pumped into the tank or withdrawn therefrom.

The objectives of this invention are attained by providing the particular circuitry illustrated in FIG. 2 of the drawing. The circuitry of FIG. 2 includes the bridge network of FIG. 1 and its associated circuitry. The associated circuits of the bridge network include inverter and rectifier networks. These latter networks are connected between movable contacts 6 and 8 and points 9 and 10 of the bridge circuit. Corresponding reference numerals of FIGS. 1 and 2 identify equivalent elements in both figures.

In accordance with the present invention, an electrical inverter circuit is connected between points 9 and 10 of the bridge network and includes saturable magnetic core means for producing an alternating output quantity having a characteristic which gives an indication of the magnitude of a unidirectional input quantity. More specifically, the inverter circuit produces an alternating output quantity having positive and negative pulses with time durations dependent upon the magnitude of the input quantity.

With reference to FIG. 2, the inverter circuit includes translating means in the form of a magnetic core 17 which may be constructed of any suitable magnetic material. The core 17 is designed for magnetic saturation within the range of energization thereof. In order to permit magnetization of the core 17, suitable input winding means 20 and 21 are provided to link the core 17. An output quantity 18 also links the core 17 in inductive relation with the winding means 20 and 21 for supplying an alternating output quantity to the output winding 18. Output winding 18 is energized in accordance with the voltage induced in the winding in response to energization of the winding means 20 and 21. The circuit further includes a source of undirectional voltage which is represented by the battery 40 for providing an input quantity which is to be inverted. The source 40 may comprise any suitable constant source of unidirectional voltage. Windings 20 and 21 are provided in order to permit magnetization of the core 17 in accordance with current of the source 40 for causing the induction of an alternating output voltage in the winding 18. Windings 20 and 21 preferably have an equal number of turns in order to insure equal induced voltages therein. Each of the windings 20 and 21 is connected for energization from the source 40 through a separate current path to provide opposing direction of magnetization of the core 17. As illustrated in FIG. 2 (elements 20 and 21 are alternately included in paths between 9 and 10). The energization of windings 20 and 21 from source 40 is controlled by a pair of switch devices 15 and 16. Although these switch devices 15 and 16 may take any suitable form, three electrode junction transistor devices are preferred. Each of these transistor devices, as shown, includes emitter, collector and base electrodes.

The transistors are biased as shown so as to operate as controlled switch devices with each transistor having a closed operating condition wherein the transistor exhibits a very low impedance condition between the emitter and collector electrode, and an open operating condition wherein the transistor exhibits a very high impedance condition between the emitter and collector electrodes. In order to provide efficient operation of the circuit the transistors 15 and 16 are preferably operated to transfer between saturated and cutoff conditions. As is well known in the art, the term "saturated" denotes a transistor condition wherein a further increase in the magnitude of forward current between the base and emitter electrodes has a negligible effect upon the magnitude of current between the emitter and collector electrodes. The term "cutoff" refers to a condition of a transistor wherein a further increase in the magnitude of reverse voltage between the base and emitter electrodes is ineffective to further decrease a magnitude of current between the emitter and collector electrodes. The saturated condition corresponds to the closed operating condition of transistors, while cutoff corresponds to the open operating condition of the transistors.

As disclosed, windings 19 and 22 comprise control means for establishing opposing conducting conditions of transistors 15 and 16. For this purpose, one terminal of winding 19 is connected to the emitter electrode of transistor 15 whereas the other terminal of the winding 19 is connected to the base electrode of transistor 15. Similarly, one terminal of winding 22 is connected to the base electrode of transistor 16 while the other terminal of winding 22 is connected to the emitter electrode of transistor 16.

It has been generally noted in the above discussion that one of transistors 15 and 16 will assume a current conducting condition while the other of the transistors will assume a non-conducting condition.

In order to describe the particular operation of the inverter, first it will be assumed that transistor 15 is in a non-conducting condition. In this instance, current will flow from source 40 through the emitter and collector electrodes of transistor 15 and through winding 20. This current flow through winding 20 produces a constant change in magnetic flux which induces a voltage in each of windings 18, 19, 20, 21 and 22. Resistances 27 and 28 constitute the load resistors for transistors 15 and 16, respectively. Resistors 25, 26, 29 and 30 are stabilizing resistances which function in a well known manner. Capacitor 34, in conjunction with output winding 18, forms a known resonant circuit for the output current. Capacitor 33 functions as a reservoir capacitor for the rectified output. This action continues until the core 17 is saturated which results in a reduction to zero of the current flowing in windings 20 and 21. During demagnetization of core 17, voltages are induced in windings 19 and 22 which have polarities opposite to the polarities of the voltages induced in these windings during magnetization of the core. The voltage so induced in winding 22 initiates a transfer of transistor 16 from a cutoff condition to a saturated condition. With transistor 16 in an operating condition, the resulting voltage induced in winding 19 maintains a cutoff condition of transistor 15. It then becomes obvious that the cycle of operation of the inverter circuit as above described is constantly repeated.

As in the instance described, the operation causes an induced voltage in output winding 18 which is alternating and has a rectangular wave pattern.

This output is rectified by rectifier 31 and applied through relay coil 13 to transistor 14.

It is to be noted that the bridge network only supplies the base current for transistor 14 while the isolated D.C. supply furnishes the relay current. Therefore, the emitter current, which is made up of base current and relay current, does not pass through the gauge potentiometer and cause degeneration.

It is well known that the base emitter-junction of a silicon transistor has a threshold voltage in the order of some 600 millivolts at room temperature. It can be seen that a bias current is established in diode 32 from source 40 through resistor 24 and that a forward threshold voltage exists across diode 32. The magnitude and temperature coefficient of this forward threshold voltage is nominally identical to that of the transistor base to emitter junction. It is obvious that these two threshold voltages are opposite in polarity and cancel one another and that, when there is no potential difference between contact 6 and contact 8, the transistor will be at the point of cutoff. This cancellation exists with a balanced bridge. Any unbalanced voltage existing with contact 6 positive to contact 8 will result in some transistor conduction. Without diode 32 to back off the base emitter forward threshold voltage, there would be required an unbalance voltage signal of the order of 600 millivolts before conduction of transistor 14. This device reduces the 600 millivolt threshold essentially to zero. Further, since the temperature coefficient of the transistor base emitter junction and the diode 32 are essentially the same, the cancellation of the threshold voltage will be maintained over a wide temperature range. In consequence of this, only a relatively low bridge unbalance voltage is required to fire transistor 14 and, accordingly, energize relay armature 13. Therefore, the fuel line control 38 will be actuated in response to low voltages produced by a slight unbalance of the bridge network.

Resistor 23 is a limiting element placed in series with the transistor base to limit the maximum reverse current, which may flow should the gauge potentiometer contact be at or near ground potential. Resistor 24 constitutes a limiting resistor for diode 32.

It will be reiterated at this point that the Wheatstone bridge formed by potentiometers 1 and 2 is in balance only when the actual fuel load is equal to the demanded fuel load. In this condition there will be no current in the base-emitter of the transistor and relay 13 will be unenergized.

The transistors and diodes utilized in the circuitry shown may be identified as follows: transistors 15 and 16—2N1038, transistor 14—J510, diode 31—IN2069, diode 32—SG22.

Typical values for the remainder of the elements are as follows: potentiometers 1 and 2—5,000 ohms, relay armature 13—2500 ohms, windings 18, 20 and 21—200 turns, windings 19 and 22—30 turns, resistor 23—2200 ohms, resistor 24—22,000 ohms, resistors 25 and 29—51 ohms, resistors 26 and 30—5600 ohms, resistors 27 and 28—22 ohms, D.C. source—28 volts.

With these values, a breadboard circuit was constructed and tested at room temperature and then over a temperature range of minus 55° centigrade to plus 81° centigrade. At room temperature the voltage differential was 0.5%. This differential was approximately constant over the whole temperature range and the total change in operating point was less than 0.5%. Even with an allowance of about 0.5% error due to the control circuit, it is reasonable to claim a sensitivity of 1% or better.

It will be evident that the objects of the invention have been achieved in providing an extremely sensitive load limit control which is operable under a wide variety of environments.

While the invention has been described in connection with the preferred embodiment thereof, it is to be understood that this description is illustrative only and is not intended to limit the invention.

I claim:

1. A control circuit comprising first and second gauge units, a Wheatstone bridge network connected between said first and second gauge units and having a balanced and an unbalanced condition, a relay connected in said Wheatstone bridge network, a transistor connected in circuit with said relay for controlling the operation of said relay in response to said unbalanced condition and possessing a voltage threshold of operation, a voltage source for said relay, a diode having a forward threshold voltage and a resistor in series with said voltage source and connected in parallel with said transistor and said relay for reducing said voltage threshold essentially to zero, whereby said transistor conducts current to said relay in immediate response to an unbalanced bridge condition.

2. A control circuit comprising first and second movable gauge units, a Wheatstone bridge network having adjustable arms mechanically connected respectively to said first and second gauge units and having a balanced and an unbalanced condition, a relay connected in response to the unbalanced condition of said bridge network, first and second potentiometers constituting the balancing means of each of the arms of said bridge network, a transistor connected in circuit between said relay and said first potentiometer for controlling the operation of said relay, said transistor having an operating threshold voltage, a voltage source for said relay, a diode having a forward threshold voltage and a resistor in series with said voltage source and connected in parallel with said transistor and said relay for reducing said threshold voltage essentially to zero, said transistor being operative during said unbalanced condition of said bridge circuit and inoperative during said balanced condition of said bridge circuit, whereby said relay is immediately responsive to the slightest unbalanced condition of said bridge.

3. A control circuit comprising first and second gauge units, a Wheatstone bridge network connected between said gauge units and having first and second potentiometers constituting a balancing means for said bridge network, said balancing means further comprising a transistor having an operating threshold voltage and having its base and emitter connected to said first and second potentiometers respectively and its collector connected to a relay, a voltage source connected to said relay and diode means having a forward threshold voltage connected in parallel with said transistor and said relay for reducing said threshold voltage essentially to zero when said bridge is in a balanced condition, whereby said transistor conducts current to said relay in immediate response to an unbalanced bridge condition.

References Cited in the file of this patent
UNITED STATES PATENTS

| | | |
|---|---|---|
| 2,282,726 | Jones | May 12, 1942 |
| 2,635,225 | Hadady | Apr. 14, 1953 |
| 2,763,283 | Griffith et al. | Sept. 18, 1956 |
| 2,922,930 | Schaeve | Jan. 26, 1960 |
| 2,972,684 | Elliot et al. | Feb. 21, 1961 |
| 3,075,128 | Cutsogeorge et al. | Jan. 22, 1963 |
| 3,092,760 | Manners et al. | June 4, 1963 |